H. W. BROWN.
TIME LIMIT RELAY.
APPLICATION FILED JUNE 18, 1913.
1,194,132.
Patented Aug. 8, 1916.
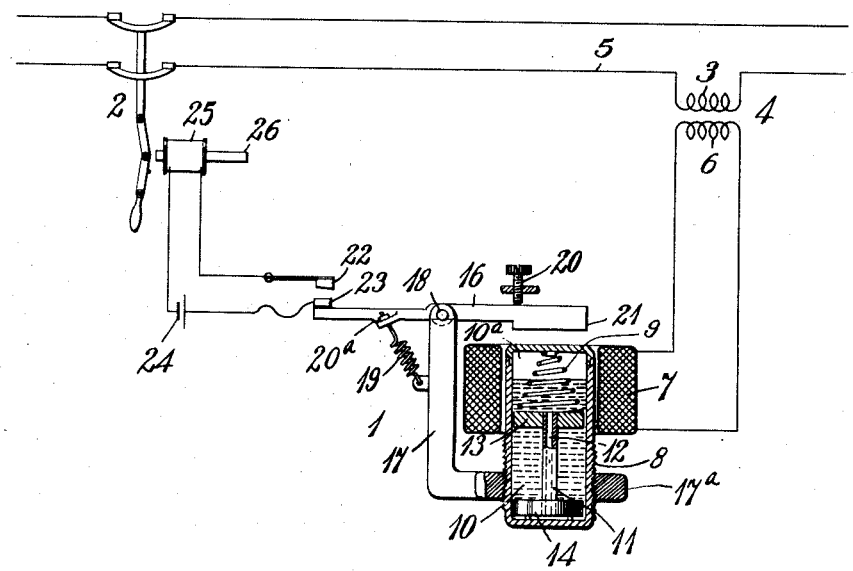
WITNESSES:
Fred H. Miller
Geo. W. Hansen.
INVENTOR
Harold W. Brown
BY
Wesley G. Carr
ATTORNEY

UNITED STATES PATENT OFFICE.

HAROLD W. BROWN, OF ITHACA, NEW YORK, ASSIGNOR TO WESTINGHOUSE ELECTRIC AND MANUFACTURING COMPANY, A CORPORATION OF PENNSYLVANIA.

TIME-LIMIT RELAY.

1,194,132.      Specification of Letters Patent.      Patented Aug. 8, 1916.

Application filed June 18, 1913. Serial No. 774,351.

*To all whom it may concern:*

Be it known that I, HAROLD W. BROWN, a citizen of the United States, and a resident of Ithaca, in the county of Tompkins and State of New York, have invented a new and useful Improvement in Time-Limit Relays, of which the following is a specification.

My invention relates to electrically operated time limit devices, and it has particular reference to time limit relays which actuate or control the operation of auxiliary or protective devices, such as circuit-breakers.

In electrical systems which distribute energy for power and light, it is essential that the continuity of service be uninterrupted except when an abnormal condition exists in the circuit for a time beyond that which assures protection to the electrical equipment in the system. When an abnormal disturbance, such as a short circuit, exists momentarily, no destruction threatens the electrical apparatus, and, therefore, it is undesirable to interrupt the service being rendered. But, if the disturbance continues for a time beyond that which precludes safety to the equipment, it is essential to operate the protective devices in the circuit. It is for this latter service that my invention is particularly adapted.

An object of my invention is to provide a device whereby the operation of protective apparatus is positively assured when abnormal conditions exist in an electrical circuit beyond a certain definite time limit. A relay constructed in accordance with my invention may be adapted for operating either over-voltage protective devices, overload-current protective devices, etc.

In the accompanying drawing, the single figure comprises a side view, partially in section, of a relay embodying one form of my invention and a diagram of the system in which the relay is used.

The relay 1, being a part of an electrical system shown diagrammatically in the drawing, controls the operation of a circuit-breaker 2 which is inserted between the generating apparatus and the receiving apparatus. As shown, the relay 1 is an overload current time limit relay, and my description will be confined to such a device, although I do not wish to be understood as limiting my invention to overload current time limit relays.

A primary winding 3 of a series or current transformer 4 is inserted in series with a power conductor 5 of an electrical distributing system, the apparatus in which is to receive protection from overload currents. A secondary winding 6 of the current transformer 4 is connected in closed circuit with the winding of a coil 7 which furnishes magnetic energy to the relay 1. Projecting through an opening of the coil 7, and placed in the magnetic field thereof, is an inclosed cylinder 8 made of non-magnetic material, such as brass. The chamber inclosed by the walls of the cylinder 8 contains a double piston member, a compression member or spring 9, a fluid 10 which preferably is oil, and an air space $10^a$. The double piston member comprises a tube 11 provided with a longitudinally extending opening 12, an annular disk 13, preferably made of magnetic material and positioned concentrically at the upper end of the tube 11, and an annular disk 14 made of magnetic material and positioned concentrically at the lower end of the tube 11. The diameter of each of the disks 13 and 14 is a little less than that of the interior diameter of the cylinder 8 so as to permit the double piston to travel in the cylinder without undue friction. As shown in the drawing the cylinder 8 is so positioned in the opening of the coil 7 that the disk 13, when the double piston is inoperative, occupies a position at the lower portion of the opening in the coil 7. The air space $10^a$ allows for temperature changes and the resulting expansion and contraction.

The circuit for the magnetic flux generated by the coil 7 consists, in part, of a pivoted member or lever 16, and a support 17 both being made of magnetizable material. Integrally formed upon the support 17 is an annular portion $17^a$ which encircles the cylinder 8 preferably below the horizontal plane that divides the double piston member into halves. The exterior wall of the cylinder 8 and the annular portion $17^a$ are threaded, thus providing means for adjusting the position of the cylinder 8 relative to the coil 7. The movement of the lever 16 about its fulcrum 18 is restrained in one direction by a tensional element or spring 19 and is limited in the other direction by an adjusting screw 20. The spring 19 is provided with an adjusting screw 20ª by means of which the operation of the lever 16 may be regulated.

When current passes through the winding of the coil 7, a magnetic flux is generated, the value of which, within limits, is proportional to the quantity of the current flowing. As the load current in the power circuit and, consequently, the current through the secondary winding 6 of the series transformer and the coil 7 increases, the magnetic attraction between the moving element which comprises the disks 13 and 14, and the lever 16 is increased. When the force of attraction for the disks 13 and 14 is of the proper magnitude, the double piston will begin to ascend in the cylinder 8. This upward movement will continue until checked by forces reacting upon the disk 13, providing the load current equals or exceeds, for a definite time, the value which causes the initial movement of the double piston. The helical and spirally wound spring 9 is compressed as the double piston ascends. As the spring 9 gradually collapses, it becomes stiffer, thus effectively counterbalancing the increase of magnetic pull between the lever 16 and the double piston member as said piston member ascends. As the current through the coil 7 decreases in value, the spring 9 reacts and causes the double piston to descend and return to its inoperative position at a current value equal to that which caused the initial movement of the piston. When the double piston occupies the extreme upper position in the cylinder 8, the magnetic pull upon a projection 21 which is formed upon the lever 16 and is placed in the direct path of the magnetic flux from the coil 7, is sufficient to actuate the lever against the resisting moment offered by the spring 19.

The double piston, in ascending in the cylinder, is retarded in its free movement by the resistance offered to it by the coil 10. However, the oil is permitted to pass at a predetermined rate through the opening 12 in the tube 11, to displace the same from the upper to the lower portion of the cylinder as the piston moves upward. The time required for the double piston to reach its upper position is equivalent to the predetermined time limit at the end of which the protective devices in the circuit must be actuated so as to insure safety to the electrical apparatus. This predetermined time limit depends upon the size of the opening 12, the density of the fluid 9 and the structure of the circuit for the magnetic flux generated by the coil 7.

By regulating the tension of the spring 19 and the degree of saturation of the tube 11, the shape of the time curve of the relay may be varied, thereby broadening the application of the relay 1.

When the lever 16 is actuated, engagement of contact terminals 22 and 23 is effected to close an auxiliary circuit comprising a battery 24 and a tripping magnet 25 of the circuit-breaker 2. The plunger 26 of the tripping magnet, thus energized, is actuated to open the circuit breaker 2 and thereby protects the power circuit from overload currents which, if maintained beyond a certain time limit, would be dangerous to the apparatus.

The invention may be modified without departing from the spirit of my invention, and the description above given merely describes, and the drawing merely illustrates, one embodiment of my invention.

I claim as my invention:

1. A time-limit device comprising a magnetizing coil, a casing containing a body of fluid, a movable magnetizable core member having a central portion of relatively small cross-sectional area, said member being located within the said casing and adapted to travel in the magnetic field of the coil, means for retarding the free movement of the said core, and a magnetizable member adapted to be actuated when the said core assumes a predetermined position.

2. A time-limit device comprising a magnetizing coil, a casing containing a body of fluid, a movable magnetizable core having a central portion of relatively small cross-sectional area, said core being located within the said casing and positioned to travel in the magnetic field of the coil, means for coöperating with the said fluid to oppose the free movement of the said core and a member adapted to be actuated when the said core assumes a predetermined position.

3. A time-limit device comprising a magnetizing winding, a vessel containing a body of liquid, a two-part movable magnetizable core member having a connecting portion of relatively small cross-sectional area, means for retarding the free movement of the core member and a magnetizable member adapted to be actuated when the core assumes a predetermined position.

4. A time-limit relay comprising a magnetizing winding, a two-part movable magnetizable member having an easily saturated connecting portion, a vessel containing a body of fluid, means coöperating with the fluid to oppose the free movement of the said movable member and a member adapted to be actuated when the said core assumes a predetermined position.

5. A time-limit device comprising a magnetizing winding, a vessel containing a body of liquid, a two-part movable magnetizable core member having a relatively easily saturated connecting portion for its two parts, means for retarding the free movement of the core, the said core being adapted to be operative when a predetermined current traverses the winding, and a magnetizable member adapted to be actuated when the said core has assumed a predetermined position.

6. A time-limit relay comprising a magnetizing winding, a vessel containing a liquid, a two-part movable magnetizable core member having a relatively easily saturated connecting portion, said member being adapted to travel in the magnetic field of the winding and normally positioned out of the portion of the field of maximum intensity, resilient means for coöperating with the said liquid to oppose the free movement of the said magnetizable core member and an armature adapted to be actuated when the core member has assumed a predetermined position.

7. A time-limit device comprising a magnetizing winding, a vessel containing a liquid, a two-part movable magnetizable core member having a connecting portion of relatively small cross-sectional area, said core member being adapted to travel in the magnetic field of the winding and normally positioned out of the portion of the field of maximum intensity, and a member adapted to be actuated when the core has assumed a predetermined position.

In testimony whereof, I have hereunto subscribed my name this 4th day of June, 1913.

HAROLD W. BROWN.

Witnesses:
 GEO. B. DAVIS,
 HARRIETTE C. TORREY.